(12) United States Patent
Hainzinger et al.

(10) Patent No.: US 11,952,043 B2
(45) Date of Patent: Apr. 9, 2024

(54) PROFILED BRACE, IN PARTICULAR FOR A MOTOR VEHICLE

(71) Applicant: Bayerische Motoren Werke Aktiengesellschaft, Munich (DE)

(72) Inventors: Michael Hainzinger, Volkenschwand (DE); Daniel Tauchnitz, Mainburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 267 days.

(21) Appl. No.: 17/293,235

(22) PCT Filed: Nov. 5, 2019

(86) PCT No.: PCT/EP2019/080234
§ 371 (c)(1),
(2) Date: May 12, 2021

(87) PCT Pub. No.: WO2020/099186
PCT Pub. Date: May 22, 2020

(65) Prior Publication Data
US 2022/0048573 A1 Feb. 17, 2022

(30) Foreign Application Priority Data
Nov. 13, 2018 (DE) ..................... 10 2018 128 321.0

(51) Int. Cl.
*B62D 25/00* (2006.01)
*B62D 27/06* (2006.01)
(Continued)

(52) U.S. Cl.
CPC ........... *B62D 25/00* (2013.01); *B62D 27/065* (2013.01); *B60R 19/24* (2013.01); *B60R 19/26* (2013.01); *B60R 19/34* (2013.01); *B62D 21/152* (2013.01)

(58) Field of Classification Search
CPC .... B62D 25/00; B62D 27/065; B62D 21/152; B60R 19/24; B60R 19/34; B60R 19/26
(Continued)

(56) References Cited

U.S. PATENT DOCUMENTS 6,299,227 B1 * 10/2001 Kroning .................. B60R 19/34
293/133

FOREIGN PATENT DOCUMENTS

CN 102328695 A 1/2012
CN 104058010 A 9/2014
(Continued)

OTHER PUBLICATIONS

PCT/EP2019/080234, International Search Report dated Jan. 20, 2020 (Two (2) pages).
(Continued)

*Primary Examiner* — Amy R Weisberg
*Assistant Examiner* — Dana D Ivey
(74) *Attorney, Agent, or Firm* — Crowell & Moring LLP

(57) ABSTRACT

A profile strut includes an upper chord, a lower chord, two spaced-apart lateral walls which, together with the upper chord and the lower chord, define an interior, and a first profile end and a second profile end. A first end piece is disposed in the first profile end and a second end piece is disposed in the second profile end. A connecting web connects the first end piece to the second end piece. Each of the first end piece and the second end piece bears via end faces thereof against adjacent inner wall regions of the upper chord and the lower chord; respectively. An intermediate region, which is configured as a tunnel incorporated into the lower chord, is disposed between the first profile end and the second profile end.

7 Claims, 1 Drawing Sheet

(51) Int. Cl.
     *B60R 19/24*      (2006.01)
     *B60R 19/26*      (2006.01)
     *B60R 19/34*      (2006.01)
     *B62D 21/15*      (2006.01)

(58) Field of Classification Search
     USPC ................................................ 296/187.01
     See application file for complete search history.

(56) References Cited

FOREIGN PATENT DOCUMENTS

| | | | | |
|---|---|---|---|---|
| CN | 104554099 | A | 4/2015 | |
| CN | 205589162 | U | 9/2016 | |
| CN | 106043443 | A | 10/2016 | |
| CN | 207225468 | U | 4/2018 | |
| DE | 2 105 090 | A1 | 8/1972 | |
| DE | 195 45 069 | A1 | 4/1997 | |
| DE | 19545069 | A1 * | 4/1997 | ............ B60R 19/18 |
| DE | 10 2008 032 543 | A1 | 4/2009 | |
| DE | 102008032543 | A1 * | 4/2009 | ............ B60R 19/34 |
| DE | 10 2009 020 079 | A1 | 11/2010 | |
| DE | 10 2009 044 417 | A9 | 5/2011 | |

OTHER PUBLICATIONS

German Search Report issued in German application No. 10 2018 128 321.0 dated Feb. 28, 2019, with Statement of Relevancy (Eight (8) pages).
English-language Chinese Office Action issued in Chinese application No. 201980072242.2 dated May 10, 2023 (Seven (7) pages).

* cited by examiner

PROFILED BRACE, IN PARTICULAR FOR A MOTOR VEHICLE

BACKGROUND AND SUMMARY OF THE INVENTION

The invention relates to a profile strut, which is provided in particular for a motor vehicle.

Such profile struts, as are known for example from DE 21 05 090 A, can be a constituent part of the body of a motor vehicle and can be used, for example, as a tension-compression strut.

Other, known profile struts have profile ends which are crimped, or are crimped with inserts (tube in tube), or have a crimped profile end with a welded-on spacer sleeve.

Alternative embodiments have uncrimped ends with a welded counterpart. Alternatives have profile ends with welded multipart end pieces or comprise a plugged-through bushing which is welded to a chord.

Also known are solid material struts and strut attachments to a chord, for example using a press-in nut.

Greatly crimped profile ends suffer the disadvantage of a small clamping length, thus making the design of the screw in the case of expansion screws problematic.

There can also occur stiffness losses at the strut end and extra weight as a result of a function loss when crimping.

In the case of welded end pieces, there results an increased corrosion loading due to the welding operation as a result of a silicate bond and disbanding of cathodic electrocoat. Moreover, the costs for welding processes are high.

A one-sided chord attachment suffers the disadvantage that applied loads cannot be transmitted via the second chord, thus meaning a stiffness loss and an increase in the weight.

It is therefore the object of the present invention to provide a profile strut of the type specified herein that makes it possible at least to minimize a stiffness loss up to the profile end, preferably to completely eliminate it, with the intention being to allow adaptations to the profile strut for reasons of installation space.

According to the invention, a profile strut is provided which is suitable in particular for motor vehicles. For example, the profile strut according to the invention can be designed as a component for a vehicle body.

The profile strut according to the invention has an upper chord and a lower chord which, together with two lateral walls spaced apart so as to correspond to the width of the upper chord and lower chord, delimit an interior of the profile strut. In at least one profile end there is arranged an end piece which bears by way of its end faces against an adjacent inner wall region of the upper chord and against an adjacent inner wall region of the lower chord and can thereby be fixed by means of a frictional connection or integrally bonded connection. This means that the end piece bridges the distance between these inner wall regions, with the result that it is possible for the end piece to be able to transmit an applied force from the upper chord of the profile to the lower chord of the profile, with the result that considerable crimping of the profile strut does not occur in this region, which would lead to a stiffness loss. Furthermore, this construction avoids a multipart welding solution.

By virtue of the fact that no stiffness loss occurs in the profile strut according to the invention, since its cross section is maintained up and into the end region(s), there results a further advantage in the form of weight optimization.

Furthermore, it is possible to achieve a maximum clamping length, which is advantageous in particular with the provision of an overelastic screw connection or with the provision of expansion screws.

Moreover, the corrosion resistance of the profile strut according to the invention is improved, since a welded connection can be avoided.

In addition, the profile strut according to the invention can be produced more cost-effectively, since a welding process can be avoided and since the construction of the profile strut according to the invention allows manufacture that can be readily automated.

To fix the end piece in the profile end, it can be at least slightly clamped. For this purpose, it is possible to use a, preferably in any case provided, screw connection if such a screw connection is provided for connecting the profile strut via its profile end to another component. Alternatively, it is possible to press an end piece with oversize into the profile end and thus produce the frictional connection.

Alternatively, it is possible to locally deform the profile end to a slight degree in order to fix the end piece frictionally.

In a further alternative type of connection, it is possible to shrink the end piece by correspondingly cooling it to give its dimensioning and/or to expand the profile end by correspondingly heating it in order to be able to achieve the desired frictional fixing by means of clamping.

In a further alternative embodiment, the end piece can be inserted without oversize into the profile end and be fixed laterally via one or more weld points or a weld seam in order to form an integrally bonded connection. For this purpose, a bore can be incorporated in one lateral wall or in both lateral walls, through which bore the weld point or the weld points can be applied.

In a further preferred embodiment, it is possible that the material of the profile strut differs from the material of the end piece. For example, the profile strut can be produced from metal, and the end piece can be produced from plastic or another metal.

Preferably, the end piece has a through-aperture/bore or a plurality of such through-apertures or bores in order to be able to apply one or more screws.

To position the end piece in the profile end, it is possible to plug it into the profile of the profile strut from different directions.

The end piece can preferably be designed as a circular cylindrical sleeve (tube). Alternatively, it is possible for the end piece to be adapted to the cross section of the interior of the profile strut according to the invention, that is to say to design it to be, for example, parallelepipedal if the cross section of the profile strut is square.

Further details, features and advantages of the invention will become apparent from the following description of the figures.

DETAILED DESCRIPTION OF THE DRAWINGS

Figure 1:
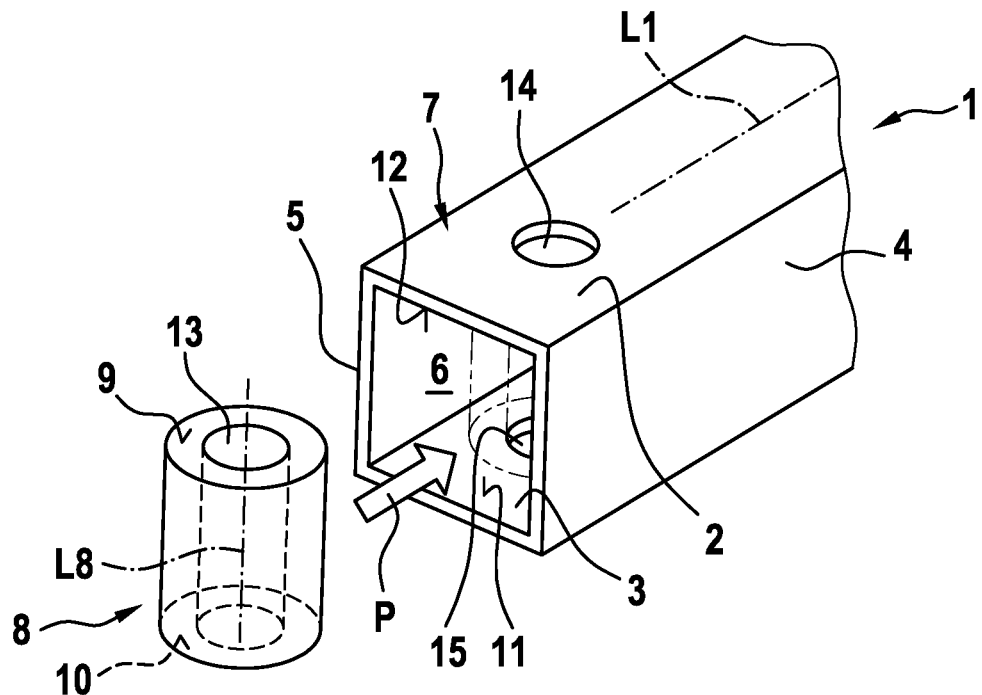
FIG. 1 shows a schematically slightly simplified perspective basic illustration of a profile strut according to the invention in the region of its profile end together with an end piece to be inserted.

FIG. 1 illustrates, in a schematically simplified perspective partial illustration, a profile strut 1 according to the invention which can, for example, be a component of a body of a motor vehicle.

The profile strut 1 has an upper chord 2 and a lower chord 3 which extend over the entire length of the profile strut 1 at a distance from one another and parallel to one another. However, profile struts are also conceivable which do not have a constant cross section. The upper chord 2 and the lower chord 3 are connected to lateral walls 4 and 5 which are spaced apart corresponding to the width thereof and which, together with the upper chord 2 and the lower chord 3, delimit an interior 6 of the profile strut 1.

FIG. 1 also shows a profile end 7 of the profile strut 1, into which an end piece 8 can be inserted, which is symbolized by the arrow P.

The end piece 8 is dimensioned here in such a way that, in the inserted state, it bears by way of its two end faces 9 and 10, which are arranged at the end sides, against respective inner wall regions 11 and 12 which are adjacent in the inserted state, with the illustration chosen in FIG. 1 demonstrating that the end face 9 of the end piece 8 bears against the inner wall region 12, and the end face 10 of the end piece 8 bears against the inner wall region 11 of the profile end 7, when the end piece 8 is inserted into the profile end 7. As explained at the outset, this makes it possible for applied forces to be able to be transmitted from the upper chord 2 of the profile strut 1 to the lower chord 3 via the end piece 8. A force transmission in the reverse direction, that is to say from the lower chord 3 to the upper chord 2, is of course also possible in principle.

The insertion of the end piece 8 in the direction of the arrow P into the profile end 7 therefore means that, in the inserted state, the longitudinal axis L1 of the profile strut 1 is oriented at a right angle to the longitudinal axis L8 of the end piece 8.

As FIG. 1 further illustrates, the end piece 8 has, in the example case, a through-aperture 13 which extends along the longitudinal direction L8 and passes through the entire longitudinal extent of the end piece 8.

The profile end 7 is provided with two apertures or bores 14, 15, with the aperture 14 being arranged in the upper chord 2 and the aperture 15 being arranged in the lower chord 3.

Once the end piece 8 has been inserted into the profile end 7 of the profile strut 1, the apertures 14, 13 and 15 are in alignment, thereby making it possible, for example, for a screw to be plugged through these apertures 14, 13, 15 in order to clamp the end piece 8 in the profile end 7, with this type of fixing of the end piece 8 being advantageous in particular when such a screw connection is required in any case in order to connect the profile end 7 to another component.

Figure 2:
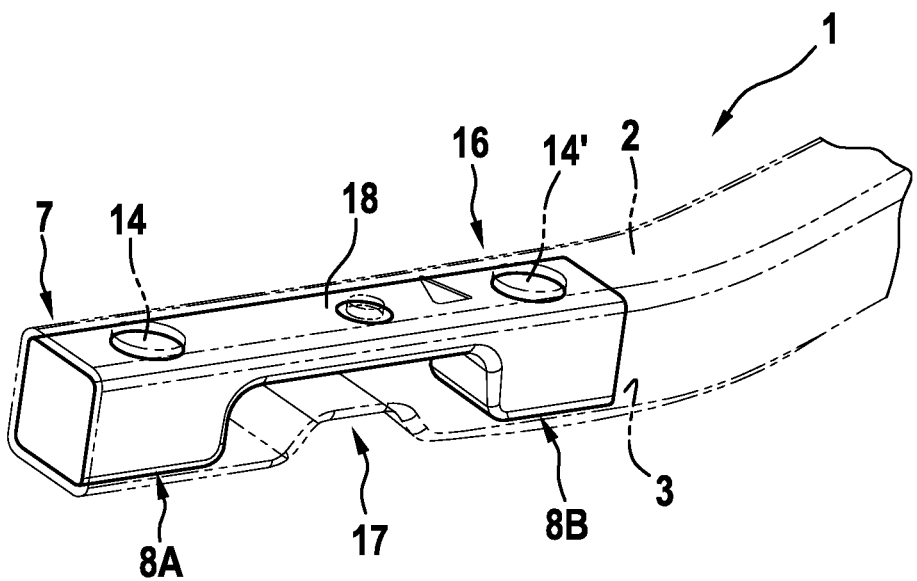
FIG. 2 shows a schematically simplified partial illustration of a profile strut according to the invention in a deformed region.

FIG. 2 illustrates a further embodiment of a profile strut 1 according to the invention having two profile ends 7, 16, with each profile end 7, 16 having respective end pieces 8A and 8B which are arranged so as to be spaced apart from one another and are connected to one another via a connecting web 18. The end pieces 8A and 8B are arranged here in the region of bores 14, 14' in the upper chord 2. Bores situated opposite, which are not visible as a result of the chosen illustration in FIG. 2, can be provided in the lower chord 3.

Between the profile ends 7, 16 of the profile strut 1 there is provided an intermediate region 17 designed as a tunnel which is incorporated into the lower chord 3 and which may be necessary, for example, for reasons of installation space and/or functional reasons.

The thus configured insert part, which is formed by the end pieces 8A and 8B and by the connecting web 18, can in turn be positionally secured in its position by means of a frictional connection or integrally bonded connection between the end faces and the inner wall regions, with at least one of the two end pieces 8A and 8B being able to be fixed in this manner. Should this be necessary for strength reasons, it is of course also possible for both end pieces 8A and 8B to be secured by an integrally bonded connection or a frictional connection. Here, the insert part can be formed as a one-piece component, or it is possible to design the end pieces 8A and 8B and the connecting web 18 as separate components which can be connected to one another, for example by means of welding.

In addition to the foregoing written disclosure of the invention, reference is hereby explicitly made, in order to supplement the disclosure, to the graphic illustration of the invention in FIGS. 1 and 2.

LIST OF REFERENCE CHARACTERS

1 Profile strut
2 Upper chord
3 Lower chord
4, 5 Lateral walls
6 Interior
7 Profile end
8 End piece
9, 10 End faces
11, 12 Inner wall regions
13 Through-aperture/through-bore
14, 15 Apertures/bores
16 Profile end
17 Intermediate region
18 Connecting web

What is claimed is:
1. A profile strut, comprising:
an upper chord;
a lower chord;
two spaced-apart lateral walls which, together with the upper chord and the lower chord, define an interior;
a first profile end and a second profile end; and
an insert part disposed within the interior, wherein the insert part has a first end piece, a second end piece, and a connecting web, and wherein the insert part is formed as a one-piece component with the first end piece, the second end piece, and the connecting web or wherein the first end piece, the second end piece, and the connecting web are welded to each other;
wherein the first end piece bears via end faces thereof against adjacent inner wall regions of the upper chord and the lower chord at the first profile end; and the second end piece bears via end faces thereof against adjacent inner wall regions of the upper chord and the lower chord at the second profile end;
wherein an intermediate region, which is configured as a tunnel incorporated into the lower chord, is disposed between the first end piece of the insert part and the second end piece of the insert part and thus at a location of the connecting web of the insert part and wherein the tunnel is formed by a raised portion of the lower chord that has a first sloped portion, a second sloped portion, and a portion disposed between the first sloped portion and the second sloped portion that is parallel to the lower chord.

2. The profile strut according to claim 1, wherein the first end piece is clamped in the first profile end and the second end piece is clamped in the second profile end.

3. The profile strut according to claim 1, wherein a material of the first and the second profile ends and a material of the first and the second end pieces are identical or different.

4. The profile strut according to claim 1, wherein the first end piece has a first through-aperture and the second end piece has a second through-aperture.

5. The profile strut according to claim 4, wherein the upper chord has a first aperture, wherein the lower chord has a second aperture, and wherein the first through aperture of the first end piece aligns with the first and the second apertures.

6. The profile strut according to claim 1, wherein the first and the second end pieces are adapted to a cross-sectional shape of the interior.

7. The profile strut according to claim 1, wherein the first end piece and the second end piece bear via the end faces thereof against the adjacent inner wall regions of the upper chord and the lower chord with a formation of a frictional connection or an integrally bonded connection between the end faces and the adjacent inner wall regions.

* * * * *